United States Patent [19]

Budelman, Jr.

[11] Patent Number: 4,622,500

[45] Date of Patent: Nov. 11, 1986

[54] ELECTRIC MOTOR CONTROLLER

[75] Inventor: Frederick T. Budelman, Jr., Elk Grove, Ill.

[73] Assignee: The Machlett Laboratories, Inc., Stamford, Conn.

[21] Appl. No.: 754,057

[22] Filed: Jul. 11, 1985

[51] Int. Cl.$^4$ ............................................. H02P 7/06
[52] U.S. Cl. .................................... 318/341; 318/318; 318/329; 318/599
[58] Field of Search ............... 318/310, 311, 318, 327, 318/329, 341, 599, 811, 254, 257, 268, 293

[56] References Cited

U.S. PATENT DOCUMENTS

| 3,947,738 | 3/1976 | Oliver | 318/341 |
| 4,449,079 | 5/1984 | Erdman | 318/254 X |
| 4,471,281 | 9/1984 | Uezumi et al. | 318/318 X |
| 4,513,231 | 4/1985 | Kuno et al. | 318/341 |
| 4,518,901 | 5/1985 | Fukushima et al. | 318/328 |
| 4,546,293 | 10/1985 | Peterson et al. | 318/341 X |
| 4,556,830 | 12/1985 | Schwalm et al. | 318/329 X |

FOREIGN PATENT DOCUMENTS

| 52-74814 | 6/1977 | Japan | 318/327 |
| 54-8822 | 1/1979 | Japan | 318/327 |
| 58-15492 | 1/1983 | Japan | 318/341 |
| 0788321 | 12/1980 | U.S.S.R. | 318/341 |

OTHER PUBLICATIONS

"A Chopper for Motor Speed Control Using Parallel Connected Power HEXFETS", by S. Clemente et al., *HEXFET Databook*, published by International Rectifier, 1985, Application Note 941A, pp. A–111 through A–122.

*Linear Databook*, published by National Semiconductor Corp., 1980, pp. 1-115 through 1-129.

*Primary Examiner*—William M. Shoop, Jr.
*Assistant Examiner*—Bentsu Ro
*Attorney, Agent, or Firm*—Richard M. Sharkansky

[57] ABSTRACT

Apparatus is provided comprising a motor having a current applied therethrough. The speed of the motor is a function of the current passing through the motor. An error signal is produced representative of the difference between the motor speed and a selected motor speed. The current applied through the motor is modulated in accordance with the speed error signal and a signal representative of the current in order to control motor speed. With such arrangement, motor current variations or ripple due to rectification are detected and compensated for to allow the speed of the motor to be maintained constant despite such ripple. In accordance with a feature of the present invention, the motor has a speed related to the current passed therethrough. An error signal is produced representative of the difference or error between the motor speed and a selected speed. A switch allows current to pass through the motor or inhibits current from passing through the motor, selectively in accordance with a control signal. The control signal is produced in response to the speed error signal and a signal representative of the motor current. The control signal comprises a pulse train having a nominal duty cycle. The duty cycle is modulated in accordance with the difference between the speed error signal and the signal representative of the current. The frequency of the pulse train is selected to be much higher than the mechanical resonant frequency of a load driven by the motor. Thus, current is passed through the switch and the motor at a much faster rate than the mechanical resonant frequency. The vibration in such load, and concomitant hum, associated with pulsing current through the motor at a rate near the mechanical resonant frequency of the load is thus substantially eliminated.

6 Claims, 4 Drawing Figures

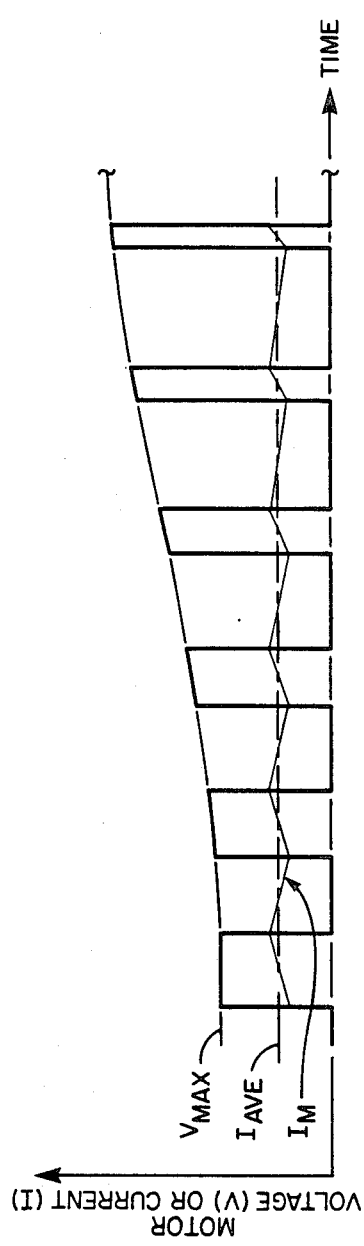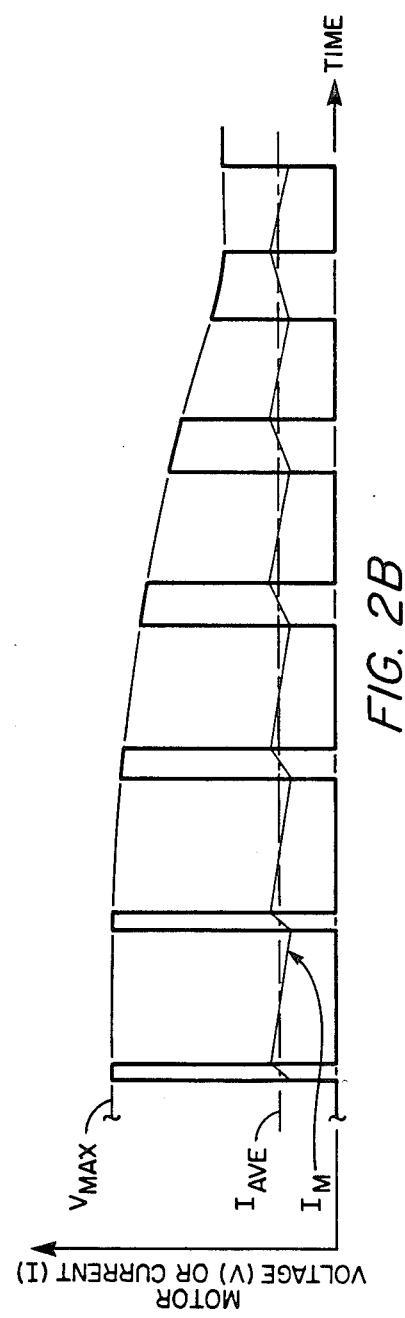

ELECTRIC MOTOR CONTROLLER

BACKGROUND OF THE INVENTION

The present invention relates generally to the field of electric motors and more particularly to apparatus for controlling the speed of rotation of such motors.

As is known, electric motors have a wide variety of applications. In many applications it is desirable that the speed of rotation of the motor be controlled. One apparatus for controlling motor speed detects actual motor speed with a tachometer and generates a control signal representing the difference between the actual and desired motor speeds. The motor is nominally powered by full-wave-rectified AC voltage. The control signal fires a silicon-controlled-rectifier (SCR) in the motor's power line when motor speed is slower than that desired, allowing the rectified voltage to be applied to the motor and thus increasing motor speed. The control signal shuts the SCR off when the speed of the motor exceeds the selected speed, thereby decoupling power from the motor and thus slowing down the motor. While such apparatus performs well in some applications, the apparatus produces large current variations in the motor because of residual ripple in the rectified AC supply voltage, thus increasing the response time of the control apparatus. Also, the motor is pulsed with power at roughly the frequency of the fully rectified AC voltage (120 Hz for 60 Hz AC). Such frequency may be close to the mechanical resonant frequency of an object mechanically coupled to, and driven by the motor resulting in vibration in the object with concomitant hum as power is coupled to and decoupled from the motor.

Another system uses pulse width modulation of a high frequency pulse train to control the speed of a motor by regulating the average, or DC, current level applied to the motor. More particularly, the actual speed of the motor is detected by a tachometer and a control signal is generated in accordance with the difference between the actual speed of the motor and a selected speed. A pulse width generator produces a pulse train having a nominal frequency and duty cycle (pulse width). The duty cycle of the pulse train is modulated in accordance with the control signal. The modulated pulse train is coupled to a switch, such as a transistor, in series with the DC motor voltage supply. The switch closes during each pulse and remains open between pulses. Thus, when the motor is rotating faster than a selected speed the modulator reduces the duty cycle of the pulse train, resulting in decreased power being applied to the motor thereby reducing the motor speed. If the motor turns too slowly, the duty cycle of the pulse train is increased by the modulator, thereby permitting greater power to be applied to the motor to increase motor speed.

While such a system performs well in most applications, it relys on a stable and precise DC motor supply voltage and current. Further, such system may not respond quickly enough in some applications to variations in the DC motor voltage and current. Thus, if the DC motor supply voltage is produced by rectifying an AC voltage supply, complex filtering must be used to substantially eliminate line ripple produced on the DC voltage to ensure a precise DC motor voltage and current level. Additionally, in some applications the motor is used to drive a high inertial load. Because of the inertia of the load, when the control signal directs the motor to reduce speed and stop from a previously selected speed, the load applies mechanical force to the motor. The motor is thus forced to continue to turn, such residual rotation being undesirable.

SUMMARY OF THE INVENTION

In accordance with the present invention, apparatus is provided comprising a motor fed by a current, the speed of the motor being a function of the current and load. Means are included for producing an error signal representative of the difference between the motor speed and a selected motor speed. Means, responsive to the speed error signal and to a signal representative of the current, are further provided for modulating the current to control motor speed. With such arrangement, rectification-induced motor current variations (i.e. ripple) are detected and compensated for to allow the speed of the motor to be maintained constant despite such ripple.

In a preferred embodiment of the present invention, the motor is fed by a current, the speed of the motor being a function of the current and load. An error signal is produced representative of the difference or error between the motor speed and a selected speed. A switch opens and closes in response to a control signal, the motor current passing through the switch when the switch is closed. Means, responsive to the speed error signal and a signal representative of the current, are further provided for producing the control signal, the control signal comprising a pulse train having a predetermined frequency and a nominal duty cycle. The control signal producing means modulates the duty cycle (i.e. the width of the pulses) in accordance with the difference between the speed error signal and the signal representative of the current. The predetermined frequency of the pulse train is selected to be much higher than the mechanical resonant frequency of a load driven by the motor. Thus, current is coupled through the switch and the motor at a much faster rate than the mechanical resonant frequency. The vibration in such load, and concomitant hum, associated with pulsing current through the motor at a rate near the mechanical resonant frequency of the load is thus substantially eliminated.

More particularly, a motor is provided fed by a current, the speed of the motor being a function of the current and load. An error signal is produced representative of the difference between the actual speed of the motor and a selected speed. A first switch is disposed in series with the motor, the first switch being responsive to a first control signal. A second switch is connected in parallel with the motor, the second switch being responsive to a second control signal. Further included are means, responsive to the speed error signal and a signal representive of the motor current, for producing a pulse train having a predetermined frequency and nominal duty cycle. The duty cycle is modulated in accordance with the difference between the speed error signal and the signal representative of the motor current. Also provided are means for coupling the modulated pulse train to the first switch as the first control signal when the speed of the motor is less than the selected speed, and for alternately coupling the modulated pulse train to the second switch as the second control signal when the speed of the motor exceeds the selected speed. Thus, when the motor speed is less than the selected speed, the motor may draw current from a serially connected power supply through the first switch in accordance with the duty cycle modulated pulse train. Alternatively, when the speed of the motor exceeds the desired speed, a short circuit is applied across the motor through the second switch in accordance with the duty cycle modulated pulse train.

BRIEF DESCRIPTION OF THE DRAWINGS

The invention and the foregoing features thereof may be fully understood from the following detailed description read in conjunction with the accompanying drawings wherein:

FIGS. 2a, 2b are time histories of current passing through the motor used in the controller of FIG. 1.

DESCRIPTION OF THE PREFERRED EMBODIMENT

Figure 1:
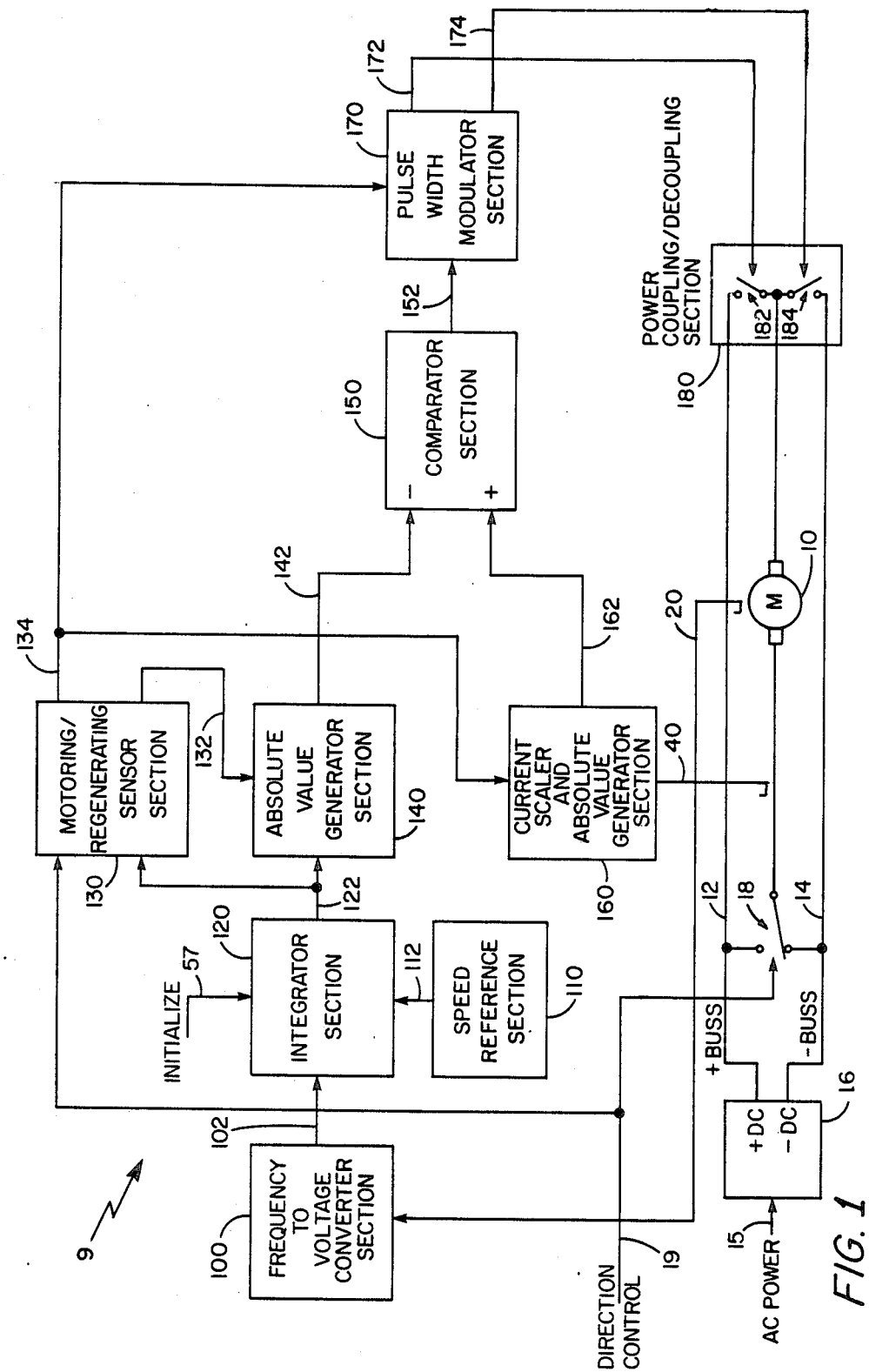
FIG. 1 is a block diagram of an electric motor controller according to the invention.

Referring now to FIG. 1, a block diagram of the motor controller 9 of the present invention is shown. Motor controller 9 responds both to the speed of rotation of motor 10 and the current flow through the armature of a conventional DC motor 10 to accurately control the speed of motor 10 even in the presence of large variations (i.e. 120 Hz ripple) in the rectified line voltage applied to motor 10 between +Bus 12 and −Bus 14 (and hence ripple in the rectified current flowing through motor 10). The speed of rotation of motor 10 is sensed on line 20 and fed to frequency-to-voltage converter section 100, which produces an output signal on line 102 having a level corresponding to the magnitude of the speed of motor 10. Speed reference section 110 produces a signal on line 112, the level of which is representative of the magnitude of the selected speed of motor 10. Integrator section 120 integrates the difference between the signal levels on lines 102, 112 and produces a speed difference or error signal on line 122. As will be discussed, the speed difference signal is a time-varying DC signal and is positive for actual motor speed less than a selected speed, and negative when the actual speed of motor 10 exceeds that selected. The polarity of the speed difference signal is detected by motoring/regenerating section 130, which couples a control signal on line 132 to absolute value generator section 140. Absolute value generator section 140 responds to such control signal to ensure that a positive (i.e. greater than 0 volts) speed difference signal is applied to comparator section 150 on line 142. The current flowing through motor 10 is sensed on line 40 and coupled to current scaler and absolute value generator section 160. A control signal generated by motoring-/regenerating section 130 is coupled on line 134 to current scaler and absolute value generator section 160 to ensure that a positive (i.e. greater than 0 volts) signal representative of current flow through motor 10 is applied to comparator section 150 via line 162. Comparator section 150 produces an error signal on line 152 corresponding to the magnitude and sign of the difference between the signal representing motor current on line 162 and the speed difference signal on line 142. Pulse width modulator section 170 generates a high frequency pulse train having a predetermined frequency (here 3 KHz) and nominal duty cycle (i.e. pulse width). Pulse width modulator section 170 responds to the error signal on line 152 (i.e. the difference between the motor speed error signal and the signal representing motor current) to modulate the pulse width of the pulses produced thereby (and hence the duty cycle of the generated pulse train). The control signal on line 134 determines on which output line, 172 or 174, the modulated pulse train will appear. A corresponding one of the switches 182, 184 of power coupling/decoupling section 180 opens and closes according to the pulse train coupled thereto, while the other one of such switches 182, 184 remains open. Current is thus applied to motor 10 in accordance with the duty cycle of the pulse width modulated pulse train.

With such arrangement, the average, or DC, level of the current applied to motor 10 is modulated at a high rate (here 3 KHz) in response both to the detected speed of motor 10 and current flow through motor 10. The frequency at which current is pulsed through motor 10 is selected to be much greater than the harmonics of a load, such as a table, being displaced (e.g. tilted) by the motor. Thus, vibration of such load due to pulsing current through motor 10, and the hum induced by such vibration, is substantially eliminated. Further, since motor controller 9 also responds at a 3 KHz rate to the current flow through motor 10, the speed of motor 10 is maintained constant even in the presence of large, low-frequency variations (i.e. ripple) in the rectified line voltage and current applied to motor 10 via +Bus 12 and −Bus 14. Such ripple may be caused by insufficient filtering in power supply 16, which rectifies an AC voltage applied thereto on line 15 to produce a DC voltage between +Bus 12 and −Bus 14. An increase (or decrease) in line voltage applied across motor 10, via power coupling/decoupling section 180 and relay 18, causes a corresponding increase (or decrease) in the magnitude of current flow therethrough, resulting in an increase (or decrease) in the level of the signal representing motor current signal on line 162. However, since the duty cycle of the control signal produced by pulse width modulator 170 is modulated at a much higher rate (3 KHz) than the frequency of the line voltage and current ripple (120 Hz for a 60 Hz signal on line 15), motor current is adjusted at a faster rate than the line ripple frequency. Hence, the current through motor 10 is maintained constant despite the presence of such ripple. This feature is illustrated in FIGS. 2a, 2b which shown the pulse width modulation of current $I_m$ applied to motor 10 as the maximum voltage $V_{max}$ available from power supply 16 increases and decreases due to rectified voltage ripple between +Bus 12 and −Bus 14. It is seen that the pulse width is varied to maintain constant the average, or DC, current $I_{ave}$ through motor 10 despite variations in $V_{max}$ due to ripple. Since the average current $I_{ave}$ through motor 10 is kept constant, motor speed remains constant. Of course, the period of pulse train $I_m$ is shown greatly expanded in FIGS. 2a and 2b for the sake of clarity.

Figure 3:
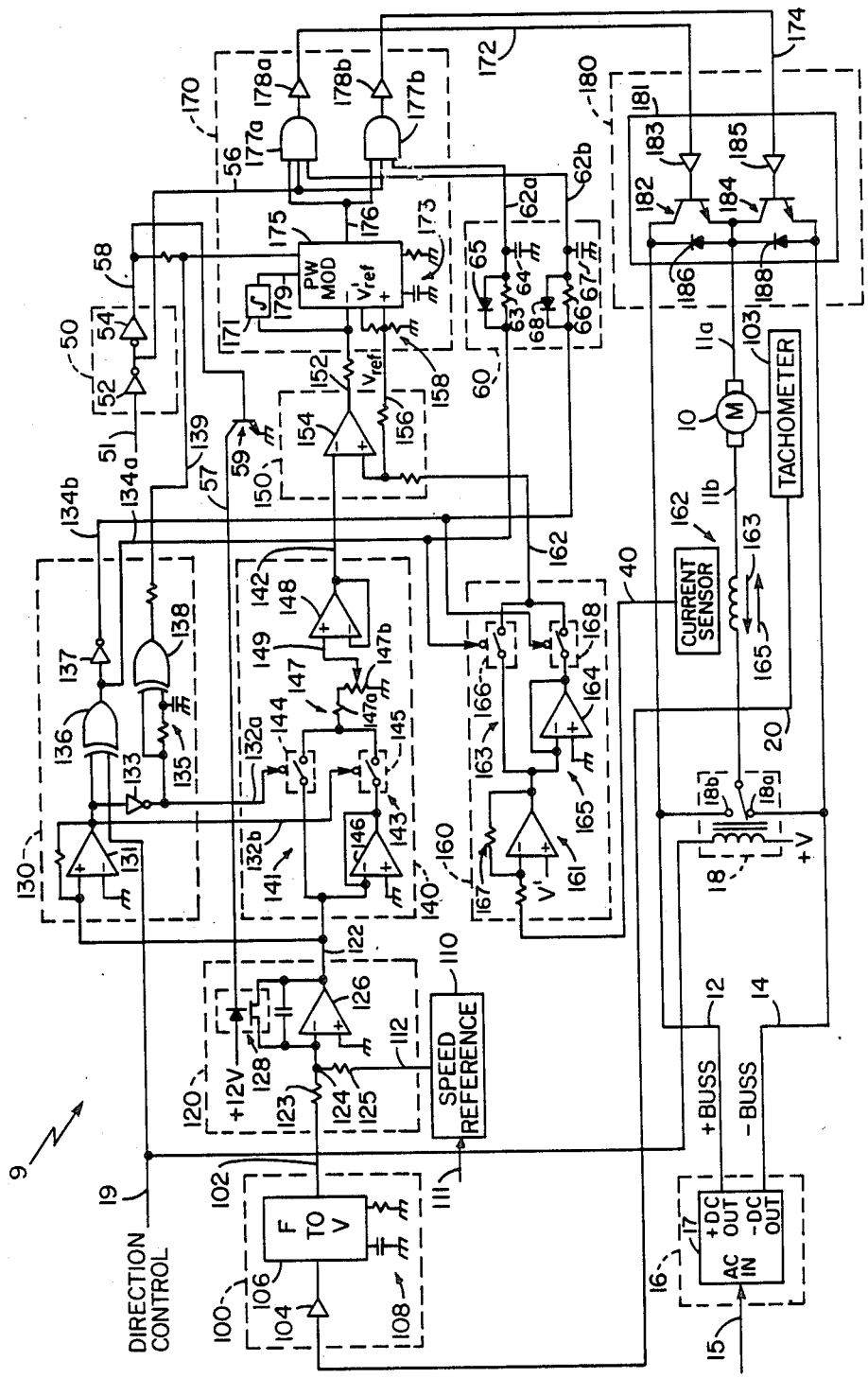
FIG. 3 is a detailed schematic diagram of the block diagram of the motor controller of FIG. 1.

Referring now to FIG. 3, the circuitry of motor controller 9 is shown in detail, with like items from FIG. 1 being denoted by like reference numbers. The positive terminal 11a of motor 10 is coupled as shown to switching circuit 181 of power coupling/decoupling circuit 180. Here, the switches 182, 184 of switching circuit 181 are transistors having base electrodes fed by drivers 183, 185, respectively. Diodes 186, 188 are connected across the collector-emitter junctions of switching transistor 182, 184, as shown, for purposes hereinafter discussed. The +Bus 12 is coupled to the collector of switching transistor 182, and −Bus 12 is coupled to the emitter of transistor 184. The busses 12, 14 are the +DC and −DC outputs of power supply 16, which comprises rectifier 17 to convert AC voltage applied on line 15 to a DC potential between +Bus 12 and −Bus 14. The return line 11b of motor 10 is coupled through current sensor 162 to relay 18. As will be described, relay 18 responds to a direction control logic signal on line 19 to coupled the return line 11b to either +Bus 12 or −14, depending on the direction (forward or reverse) in which motor 10 is selected to rotate. Relay 18 is shown deactivated in FIG. 3, thus coupling return line 11b to terminal 18a and to −Bus 14. For the purpose of this description, this position of relay 18 is used for the "forward" rotation of motor 10, and it is seen that a logic "1" is applied on line 19 to deactivate relay 18. When motor 10 is to rotate in the reverse direction the direction control signal on line 19 switches to a logic "0", activating relay 18 and coupling return line 11b to +Bus 12.

Conventional tachometer 103 is coupled to motor 10 to detect the speed of rotation thereof. The output of tachometer 103 is coupled to frequency to voltage converter section 100 on line 20. Buffer 104 receives such output and applies the signal to frequency to voltage converter (F to V) 106. Frequency to voltage converter 106 is a conventional device, such as an LM2907, manufactured by National Semiconductor Corp. of Santa Clara, Calif. The output of frequency to voltage converter 106 is coupled on line 102 to integrator section 120. Also coupled to integrator section 120 is the output of speed reference section 110, on line 112. The signals on lines 102, 112 are coupled through weighting resistors 123, 125 to subtracting junction 124, at which the difference or error in the levels of the signals on lines 102, 112 appears, as will be described. The difference signal is applied to integrator 126, here comprising a conventional op amp with capacitive feedback. FET switch 128 is coupled in parallel in the feedback loop of integrator 126 for initialization purposes, as will be explained.

The output of integrator 126 is fed on line 122 to absolute value generator section 140 and motoring-/regenerating section 130. Absolute value generator section 140 comprises a pair of parallel circuit paths—noninverting circuit path 141 and inverting circuit path 143—each path having a conventional analog switch, 144, 145, respectively, disposed therein. Inverting path 143 additionally includes a conventional inverter 146 (scaling resistors here not being shown). The outputs of parallel circuit paths 141, 143 are tied together and fed through current limiter 147, the function of which will be described in detail hereinafter. Buffer 148 applies the output of the current limiter 147 on line 142 to comparator 150. The function of absolute value generator section 140 is fully described hereinafter. Suffice it here to say that analog switches 144, 145 respond to complementary control signals on lines 132a, 132b to couple noninverting path 141 and decouple inverting path 143 between line 122 and current limiter 147 when the signal on line 122 is positive, and to decouple noninverting path 141 and couple inverting path 143 between line 122 and current limiter 147 when the signal on line 122 is a negative voltage. Thus, only positive signals are applied on line 142 to comparator 150.

The complementary control signals on lines 132a, 132b are generated by motoring/regenerating sensor 130. Such device comprises conventional zero-crossing detector 131, fed by the output of integrator section on line 122. The output of zero crossing detector 131 appears on line 132b and is coupled through inverter 133 to line 132a. Hence it is seen that the signals on lines 132a, 132b are complementary. The output of zero crossing detector 131 is further coupled as an input to exclusive-OR gate 136 along with the direction control signal on line 19. The output of exclusive-OR gate 136 appears on line 134a and is also fed through inverter 137, the output of which appears on line 134b. Thus, it is seen that signals on lines 134a, 134b are complementary. The output of inverter 133 is coupled directly and through delay network 135 to the input of exclusive-OR gate 138, for purposes described hereinafter. The output of exclusive-OR gate 138 is coupled on line 139 to pulse width modulator section 170, as shown.

As discussed, current sensor 162 is disposed in return line 11b of motor 10. Current sensor 162 is here a conventional Hall effect sensor, the output of which is coupled on line 40 to current scaler and absolute value generator section 160. Current scaler 161 comprises a conventional op amp having the inverting input thereof fed by line 40 and a reference voltage V' coupled to the noninverting input thereof for purposes described fully hereinafter. Feedback network 167 controls the gain of scaler 161. The output of current scaler 161 is coupled through an absolute value generator similar to that described above and comprising a pair of parallel circuit paths 163, 165. Noninverting path 163 comprises analog switch 166. Inverting path 165 includes analog switch 168 and inverter 164 (scaling resistors here not being shown). The parallel paths are coupled together and to line 162, which is coupled to comparator 150, as shown. As will be described, switches 166, 168 respond to complementary control signals on lines 134a, 134b to ensure that a positive signal is always applied on line 162 to comparator section 150.

Comparator section 150 comprises differential amplifier 154, having an inverting input fed by line 142 and a non-inverting input to which line 162 is coupled. The noninverting input of differential amplifier 154 is also applied with reference voltage $V_{ref}$ on line 156 for purposes to be explained. $V_{ref}$ is also applied to noninverting input of pulse width modulator 175 in pulse width modulator section 170. The output of differential amplifier 154 is coupled to the inverting input of pulse width modulator 175 on line 152. As will be described, when the signals on lines 142, 162 are both zero or both equal, the output of differential amplifier 154 will equal $V_{ref}$. When the signal on line 162 exceeds the signal on line 142, the output of differential amplifier 154 exceeds $V_{ref}$. Conversely, for signal levels on line 142 exceeding those on line 162, the output of differential amplifier 154 is less than $V_{ref}$.

Pulse width modulator 175 is a conventional device, here an LM3524, manufactured by National Semiconductor Corp. of Santa Clara, Calif. The device produces a +5 VDC reference voltage, $V_{ref}'$, which is here divided by a conventional resistor network 158 to produce $V_{ref}$ on line 156 and at the noninverting input of pulse width modulator 175. Here, resistor network 158 is selected to divide $V_{ref}'$ in half and thus produce a $V_{ref}$ of +2.5 VDC. Pulse width modulator 175 has an intermediate output representing the difference between the signal levels applied to the inverting and noninverting terminals thereof. Such intermediate output is applied as negative feedback on line 179, via conventional integrator 171 (here a capacitor), to the inverting input of pulse width modulator 175. The level of such intermediate output signal determines the pulse width of the output pulses of pulse width modulator 175, as will be discussed.

Pulse width modulator 175 generates an output pulse train on line 176 having a predetermined frequency and nominal duty cycle. The predetermined frequency is set by the values of the resistor/capacitor timing network 173. Here, such frequency is selected to be 3 KHz, corresponding to a 4.02 K ohm resistance value and a 0.1 μF capacitance value for network 173. The nominal duty cycle of the pulse train (i.e. the nominal width of the pulses) occurs when the signal levels at the noninverting and inverting inputs to pulse width modulator 175 are equal; that is, both such inputs equalling $V_{ref}$ (+2.5 VDC). When the output signal level of differential amplifier 154 (i.e. the error signal) is less than $V_{ref}$, the width of the pulses produced on line 176 increases from the nominal width thereof (i.e. the duty cycle of such pulse train increases). Conversely, when the level of the output signal of differential amplifier 154 exceeds $V_{ref}$, width of the pulses produced by pulse width modulator 175 decreases below the nominal width thereof (i.e. the duty cycle of such pulse train decreases). The pulse-width-modulated pulse train on line 176 is coupled to AND gates 177a, 177b. AND gates 177a 177b are enabled or disabled in accordance with a motor start control signal on line 56 from start/stop signal generator 50 and complementary control signals on lines 134a (coupled to AND gate 177b) and 134b (coupled to AND gate 177a) from motoring/regenerating sensor 130, via break-before-make circuit 60. Only one of AND gates 177a, 177b may be enabled at a time. The enabled one of the AND gates 177a, 177b passes the pulse train on line 176 therethrough. The disabled AND gate produces a low voltage output. The outputs of AND gates 177a, 177b are coupled through drivers 178a, 178b and onto lines 172, 174, respectively, to motor power coupling/decoupling section 180. Included therein is switching circuit 181 comprising drivers 183, 185, transistor 182, 184, and diodes 186, 188, connected as shown. The +Bus 12 is coupled to the collector of transistor 182. Similarly, −Bus 14 is coupled to the emitter of transistor 184. The emitter of transistor 182 and collector of transistor 184 are tied together and coupled to input terminal 11a of motor 10. Each transistor 182, 184 functions as a switch, responding to an applied pulse train from pulse width modulator 175 by conducting between the collector and emitter thereof during each pulse, thus electrically connecting input terminal 11a of motor 10 to the power buss coupled to such transistor. The transistor 182, 184 applied with a low voltage signal from the disabled one of AND gates 177a, 177b remains nonconducting, presenting a high impedance between line 11a and the power bus associated with such transistor.

In operation, motor 10 may be run in both the "forward" and "reverse" directions, for example, to raise and lower a load mechanically driven by motor 10. The direction of motor 10 is controlled by the direction control logic signal on line 19 via relay 18 (shown in the deactivated position). For the purposes of the description, a logic "1" on line 19, deactivating relay 18, corresponds to the forward direction of rotation for motor 10. A logic "0" on line 19, activating relay 18 to couple return line 11b of motor 10 to +Bus 12, commands motor 10 to rotate in the reverse direction. Motor 10 has two modes of operation for each direction, the "motoring" mode and the "regenerating" mode. The "motoring" mode occurs when motor 10 is accelerating to attain a selected rotation speed. Thus, when motor 10 is motoring, it is drawing current from power supply 16. In the "regenerating" mode, motor 10 is used to apply braking to the load being displaced thereby, that is, to slow down the rate of movement and eventually stop such load. Thus, motor 10 is rotating at a higher speed than that selected and is actually "regenerating" power. The operation of motor controller 9 will be described, first, during motoring of motor 10 in the forward direction, second, during regenerating in the forward direction, and finally for each mode of motor operation while motor 10 is rotating in the reverse direction.

Motoring; Forward Direction

As stated, for the forward direction the direction control signal on line 19 is a logic "1". Relay 18 remains deactivated, coupling return line 11b of motor 10 to −Bus 14. As will be explained, switching transistor 184 is nonconducting when motor 10 is motoring in the forward direction and transistor 182 is responsive to the pulse-width-modulated pulse train produced by pulse width modulator 175. Thus, current flows from +Bus 12, through transitor 182, motor 10, current sensor 162 and relay 18 to −Bus 14 in accordance with the pulses applied to transistor 182. When transistor 182 is not conducting, the current is recirculated through diode 188 since motor 10 acts as an inductor. Motor 10 responds to such applied current by rotating in the forward direction. Conventional tachometer 103 senses the magnitude of the speed of rotation of motor 10 and produces a pulse train on line 20 having a frequency proportional to such motor speed. The pulse train is buffered by buffer 104 and applied to frequency-to-voltage converter 106. Frequency to voltage converter 106 produces a DC voltage on line 102 having a level proportional to the frequency of the pulse train generated by tachometer 103, and hence proporitonal to the magnitude of the speed of motor 10. Timing network 108, comprising a resistor and capacitor, determines the scaling factor between the motor speed and the voltage level on line 102. Here, the components of network 108 are selected to produce +5 VDC on line 102 in response to a motor speed of 1800 RPM. This is accomplished with a resistance of 100 K ohms and 0.001 μuF capacitance.

The speed at which motor 10 is to rotate is selected by an operator and coupled to speed reference section 110 in the form of a control signal on line 111. Speed reference section 110 generates a signal on line 112 corresponding to the selected motor rotation speed. Here, such speed reference signal varies from 0 VDC, for a selected motor speed of zero, to −5 VDC, corresponding to 1800 RPM.

The actual motor speed signal on line 102 is summed at junction 124 with the speed reference signal on line 112 and a difference or error signal is produced. A little thought reveals that such difference signal is a negative voltage when motor 10 is rotating more slowly than selected, and a positive signal when motor speed exceeds selected speed. Integrator 126, here comprising an inverting op amp with capacitive feedback, integrates and inverts the difference signal produced at summing junction 124 to generate a smoothly varying DC signal. Thus, the integrated speed difference signal produced on line 122 is a variable DC signal which integrates positive when motor 10 is rotating more slowly than selected, and integrates negative to a negative voltage when actual motor speed exceeds selected motor speed. FET switch 128 is provided in the feedback circuitry of integrator 126 to properly initialize the integrator. When the motor stop/start control signal on line 51 is a logic "1" motor 10 is turned off, as will be explained. A logic 1 is also produced on line 58 by stop/start signal generator 50, turning on transistor 59 and closing FET switch 128. When motor 10 is to be started, the control signal on line 51 is switched to a logic "0". Thus, transistor 59 turns off, opening FET switch 128 and releasing integrator 126 to integrate the speed difference signal produced at junction 124.

The output of integrator section 120 on line 122 is coupled to absolute value generator section 140 and to zero crossing detector 131 of motoring/regenerating sensor section 130. The function of absolute value generator section 140 is to ensure that a positive voltage signal is coupled on line 142 to comparator section 150, even when a negative voltage signal is present on line 122. Thus, the integrated speed difference signal on line 122 is coupled through either non-inverting path 141 or inverting path 143 in accordance with the polarity of such signal. Zero crossing detector 131 is a conventional op amp used as a comparator with a 0 volt reference voltage to detect the polarity of the speed difference signal. During motoring, the speed difference signal applied thereto is positive (i.e. greater than 0 volts). Hence the output of zero crossing detector 131, on line 132b, is a logic "1". Such signal is inverted to a logic "0" by inverter 133 and placed on line 132a. The signals on lines 132a, 132b are complimentary control signals coupled to analog switches 144, 145 in paths 141, 143, respectively. Switches 144, 145 are conventional, active-low analog switches. Thus, during motoring, switch 144 closes in response to the logic "0" control signal fed thereto, and switch 145 opens in response to the logic "1" on line 132b. Thus the positive speed difference signal present on line 122 during motoring couples through noninverting path 141 to motor current limiter 147. Motor current limiter 147 is a variable resistor divider comprising fixed resistor 147a (here 50 K ohms) and potentiometer 147b (here a 100 k ohm potentiometer) to reduce the maximum voltage level of the signal applied thereto by a predetermined amount on line 149. The adjusted speed difference signal on line 149 is then coupled through noninverting buffer 148 to comparator section 150 via line 142. Buffer 148 serves to provide a low impedance signal source for comparator section 150. As will be seen, the maximum voltage level of the signal on line 142 controls the maximum amount of current permitted to flow through motor 10. Thus, the function of motor current limiter 147 is to reduce the magnitude of the speed difference signal on line 122 to a level corresponding to the maximum current flow desired through motor 10. From the resistance values cited above, it is seen that the limited speed difference signal level on line 142 will vary between zero and $\frac{2}{3}$. (100 K ohms)÷150 ohms) of the speed difference signal level on line 122, depending on the setting of potentiometer 147b.

The current flow through motor 10 is detected by current sensor 162, here a Hall effect sensor having a nominal output voltage, here equal to +6VDC. When motor 10 is motoring in the forward direction, current flows through current sensor 162 in the direction of arrow 163, causing the output of sensor 162 to decrease from 6 VDC by an amount proportional to the magnitude of current flow through motor 10. The output of current sensor 162 is coupled on line 40 to current scaler and absolute value generator section 160. The current scaler comprises an offset amplifier 161 comprising a conventional op amp with negative feedback. Offset amplifier 161 subtracts the nominal level, here +6 VDC, from the current sensor output signal, amplifies and inverts the input by a predetermined scaling factor (here, 3) set by the feedback network thereof. Thus, the output of offset amplifier 161 is a positive voltage when motor 10 is motoring in the forward direction, the level of such voltage representing the magnitude of current flow through motor 10. Such signal is fed through an absolute value generator comprising noninverting path 163 and inverting path 165 to insure that a positive voltage signal is always applied on line 162 to comparator section 150. Each path 163, 165 comprises a conventional, active-low analog switch 166, 168. The switches 166, 168 are controlled by complementary signals on lines 134a, 134b, respectively, from motoring-/regenerating sensor section 130. Such control signals are a function of the polarity of the speed difference signal on line 122 and the direction control logic signal on line 19. The output of zero crossing detector 131 (a logic 1 during motoring) is coupled to exclusive-OR gate 136 with the direction control signal (a logic 1 for forward motor rotation). The output of exclusive-OR gate 136 appears on line 134a, and it is seen to be a logic 0 during motoring in the forward direction. Inverter 137 responds thereto to produce a logic 1 on line 134b. The logic 0 on line 134a closes switch 166, completing the circuit from summing amplifier 161 to line 162 via noninverting path 163. Thus, the positive output signal of summing amplifier 161 is applied to comparator section 150 via line 162. The signal on line 162 corresponds to the magnitude of the current flowing through motor 10 and will be referred to as the motor current signal.

The motor current signal and the integrated, limited speed difference signal are applied to the noninverting and inverting inputs, respectively, of differential amplifier 154 in comparator section 150. As discussed, $V_{ref}$ (+2.5 VDC) from pulse width modulator 175 is also applied to the noninverting input of differential amplifier 154 via line 156. As a result, the output of differential amplifier 154 is equal to $V_{ref}$ whenever the levels of the speed difference signal on line 142 and motor current signal on line 162 are equal or zero. That is, the output of differential amplifier 154 is biased to be equal to $V_{ref}$ when there is no error between the levels of the speed difference and motor current signals. The output of differential amplifier 154, on line 152, is less than $V_{ref}$ when the speed reference signal on line 142 exceeds the motor current signal on line 162. Conversely, the output of differential amplifier 154 exceeds $V_{ref}$ when the motor current signal level exceeds that of the speed difference signal. Thus, it is seen that the output of differential amplifier 154 is an error signal having a magnitude corresponding to the error between the speed difference signal and the motor current signal. The error signal produced by differential amplifier 154 is coupled to the inverting input of pulse width modulator 175 on line 152. $V_{ref}$ is applied to the noninverting input of pulse width modulator 175. As discussed, pulse width modulator 175 generates a 3 KHz pulse train with a varible duty cycle (pulse width) on line 176. Pulse width modulator 175 produces an intermediate output signal on line 179. The intermediate output signal is a variable DC signal having a level corresponding to the integrated difference between the levels of the signals at the inverting and noninverting inputs of pulse width modulator 175. The level of the intermediate output signal controls the width of the pulses produced on line 176. When the difference between the signal levels applied to the noninverting and inverting inputs of pulse width modulator 175 is zero, the intermediate output signal is at a nominal level and the width of the pulses produced on line 176 is a nominal width (i.e. the output pulse train has a nominal duty cycle). When the error signal on line 152 is less than $V_{ref}$, the intermediate output signal on line 179 rises from the nominal level thereof, causing the internal circuitry of pulse width modulator 175 to correspondingly increase the pulse width of the output pulses from the nominal pulse width. Thus, the duty cycle of the output pulse train increases. The intermediate output signal is integrated by integrator 171 and fed back to the inverting input of pulse width modulator 175. The purpose of such integrating feedback is to smooth the response of pulse width modulator 175—that is, to make the device relatively insensitive to spurious variations in the error signal. When the error signal level exceeds $V_{ref}$, the intermediate output signal level of pulse width modulator 175 decreases, causing a corresponding reduction in the pulse width of the output pulses on line 176 below the nominal pulse width. The duty cycle of the output pulse train therefore decreases.

From the foregoing it can be understood that the width of the pulses produced on line 176 is modulated in accordance with the level of the output of comparator section 150. The pulse-width-modulated pulse train is applied as an input to AND gates 177a, 177b. As stated, when motor 10 is running, the stop/start signal on line 51 is a logic 0. Inverter 52 produces a logic 1 in response thereto which is coupled to AND gates 177a, 177b on line 56. As previously discussed, the complementary control signals on lines 134a, 134b are a logic 0 and a logic 1, respectively, when motor 10 is motoring in the forward direction. Such control signals are coupled through break-before-make circuit 60 to the inputs of AND gates 177b, 177a on lines 62a, 62b, respectively. The function of break-before-make circuit 60 is described in detail below. It is seen that during motoring in the forward direction, AND gate 177a is enabled by the logic 1 control signals fed thereto on lines 56, 62b; conversely, AND gate 177b is disabled by the logic 0 control signal coupled thereto on line 62a. Thus, the pulse train on line 176 is coupled through AND gate 177a and driver 178a onto line 172. A logic 0 is produced by AND gate 177b and coupled onto line 174 by driver 178b. The signals on lines 172, 174 are control signals for motor power coupling/decoupling circuit 180.

The logic 0 on line 174 is coupled by driver 185 to the base of switching transistor 184, an NPN device. Thus, transistor 184 is nonconducting and remains so during motoring in the forward direction. Diode 188 is reverse biased when transistor 182 is conducting and recirculates motor current when transistor 182 is non-conducting. The pulse-width-modulated pulse train on line 172 is coupled by driver 183 to the base of switching transistor 182. Transistor 182 conducts for the duration of each pulse and is nonconducting in the time intervals between pulses. When transistor 182 conducts, the positive DC voltage on +Bus 12 is coupled to input 11a and applied to motor 10, such voltage being decoupled from motor 10 between pulses. Thus it is seen that current increases through motor 10 during each pulse of the modulated pulse train produced by pulse width modulator 175 and decreases between pulses. It will be recalled that the frequency of such pulse train is 3 KHz. Voltage is therefore coupled to and decoupled from motor 10 at such 3 KHz rate. This frequency is selected to be well above the mechanical harmonic frequency of the load (such as a table) being driven by motor 10. Thus, vibration by such load, and the "hum" associated therewith, which occur in prior art systems having current pulsed to the motor at a low rate (such as twice the line frequency of an AC power signal), are substantially eliminated in the present invention.

When motor 10 is started from rest, it will not immediately begin rotating at the speed selected by the operator. Thus, the integrated and limited speed difference signal on line 142 will be at a higher level than the motor current signal on line 162, causing the error signal output of differential amplifier 154 to decrease below $V_{ref}$. In response thereto, pulse width modulator 175 increases the pulse width of the pulses produced thereby from the nominal width of such pulses (i.e. increases duty cycle of the produced pulse train). Thus, switching transistor 182 conducts for a longer time during each cycle of the pulse train, permitting current to flow through motor 10 for a correspondingly longer time. Current sensor 162 detects a greater total current flow through motor 10, resulting in an increase in the level of the motor current signal on line 162. Simultaneously, the rotational speed of motor 10 is increasing in response to the increase in total current through motor 10. The speed difference signal on line 142 therefore is decreasing. Thus, the difference between the levels of the signals on lines 142, 162 becomes less, causing the output of differential amplifier 154 to increase toward $V_{ref}$. Pulse width modulator 175 responds by decreasing the rate of increase of pulse width produced on line 176 towards their nominal width (i.e. the nominal duty cycle). When the actual speed of motor 10 equals the selected speed, the motor current signal level on line 162 will equal that of the integrated, limited speed difference signal on line 142. In response, differential amplifier 154 produces an output which equals $V_{ref}$. The pulse width of the pulses produced by pulse width modulator 175 becomes the nominal pulse width. A little thought thus reveals that motor controller 9 will modulate, at a 3 KHz rate, the current applied to motor 10 by varying the width of the pulse train produced on line 176 in response to differences in the levels of the speed difference signal and motor current signal. Thus, motor controller 9 maintains the speed of motor 10 constant at the selected speed despite variations in the levels of such signals.

Due to the rapid response of motor controller 9 to variations in the speed difference and motor current signal levels, the present invention maintains motor rotation speed substantially constant in the presence of large amounts of voltage variations (i.e. ripple) between +Bus 12 and −Bus 14. As discussed, the DC voltage between busses 12, 14 are produced by motor power supply 16 in response to an AC signal applied on line 15. The AC signal is typically at 60 Hz, although other frequencies may be used. Conventional full-wave rectifier 17 converts the AC input voltage to a DC voltage, which appears between +Bus 12 and −Bus 14. Here the voltage between +Bus 12 and −Bus 14 is nominally +160 VDC. During rectification, a certain amount of ripple is unavoidably imposed on such DC voltages. As is known in the art, the ripple may be substantially removed by complex and expensive filter networks in rectifier 17. However, as will become clear, the present invention eliminates the need for all but cursory filtering of the DC voltage produced between +Bus 12 and −Bus 14. Motor controller 9 will maintain constant average current and hence the speed of motor 10 even in the presence of substantial amounts of ripple, such as 20 to 40 volts or more below the nominal 160 volt DC voltage. For example, if the DC voltage between busses 12, 14 decrease from the nominal value thereof due to ripple, the voltage applied across motor 10, and hence the magnitude of the current flowing therethrough, will also decrease. The current sensor 162 will detect the decreased motor current. Differential amplifier 154 responds by decreasing the level of the error signal on line 152 below $V_{ref}$. Pulse width modulator 175 correspondingly increases the width of the pulses produced thereby (i.e. increases the duty cycle of the pulse train on line 176). Transistor 182 thus conducts for a longer time during each cycle of the pulse train. Thus, although the magnitude of each voltage pulse flowing through motor 10 has decreased due to the lower DC voltage between busses 12, 14, the voltage pulses are of longer duration. Hence, the average, or DC current flow through motor 10 remains constant to maintain constant motor speed despite the voltage ripple between +Bus 12 and −Bus 14. This response is illustrated in FIG. 2b.

Conversely, where the DC voltage between +Bus 12 and −Bus 14 increases from their nominal levels due to ripple, as in FIG. 2a, motor current will also increase due to the additional voltage applied across motor 10. Such increase in current will be detected by current sensor 162, in response to which the level of the motor current signal on line 162 increases. Differential amplifier 154 responds by increasing the level of the error signal on line 152 above $V_{ref}$. Pulse width modulator thus decreases the width of the produced pulses, allowing transistor 182 to conduct for a correspondingly shorter time during each cycle of the pulse train on line 176. Thus, the increase in the magnitude of the current flowing through motor 10 (due to the increased voltage between the +Bus 12 and −Bus 14) is offset by the shorter duration of such voltage pulses. The average current flow, $I_{ave}$, through motor 10 therefore remains constant, maintaining the speed thereof constant, despite the voltage ripple between +Bus 12 and −Bus 14.

As stated above, the DC voltage between +Bus 12 and −Bus 14 is produced from full wave rectification of an AC input signal on line 15. Here, the AC frequency is 60 Hz. Thus, the frequency of the voltage ripple between busses 12, 14 is 120 Hz. The voltage across motor 10 will therefore vary due to ripple at a much slower rate than the frequency of the pulse train control signal (here 3 KHz) applied to motor power coupling/decoupling section 180. A little thought reveals that the current flow through motor 10 is adjusted by the pulse-width-modulated control signal much faster than the rate at which the voltage across motor 10 changes. Thus it is seen that the speed of rotation of motor 10 is controlled in the present invention to remain constant at the selected speed even when the voltage applied thereto varies due to ripple between +Bus 12 and −Bus 14.

Regenerating; Forward Direction

The regenerating mode of motor 10 occurs when the motor is used to apply braking to a load put into motion by motor 10 in order to slow down and eventually stop the motion of the load. For example, motor 10 may be used to tilt a table from a horizontal to an inclined position. The motoring mode occurs when motor 10 draws current from power supply 16 to generate sufficient power to displace the table. The operation of motor controller 9 to control the speed of motor 10, and hence the rate of movement of the table, during motoring has been described above. As the table nears the desired inclined position, motor 10 is slowed to reduce the speed of the table. However, the table may be a high inertial object. Such high inertia load applies mechanical force to motor 10, forcing the motor to rotate at a higher than selected speed as the selected speed is reduced to command motor 10 to rotate more slowly. In this situation, motor 10 is actually supplying, or "regenerating" current to power supply 16 and will continue to do so without reducing speed unless some of the regenerated power is diverted away from the motor to the power supply 16 and dissipated. Thus, to effectuate the desired braking of motor 10 motor controller 9 switches to the regenerating mode. When actual motor rotation speed exceeds the selected speed, the magnitude of the output of frequency to voltage converter on line 102 exceeds that of the speed reference signal on line 112. Thus, integrator 126 integrates negative, and the signal produced thereby on line 122 becomes a negative voltage (i.e. less than 0 volts). Zero crossing detector 131 in motoring/regenerating sensor section 130 detects the signal transition below zero volts and produces a logic 0 on line 132b, such signal being inverted to a logic 1 on line 132a. Switch 145 in absolute value generator section 140 opens, and switch 144 closes, in response to the control signals on lines 132a, 132b, respectively. Thus, the negative speed difference signal on line 122 is coupled through inverting path 143 to current limiter 147. Inverter 146, here an inverting op amp with a gain of one, produces a positive signal in response to the negative speed difference signal fed thereto. Thus, the magnitude of the speed difference signal, limited by current limiter 147, is coupled through buffer 148 and onto line 142.

Because motor 10 is generating power during regeneration, current flows through the motor in an opposite direction than when motor 10 was drawing current from power supply 16, Thus, current flows through motor 10 in the direction of arrow 165 when motor 10 is regenerating in the forward direction. Current sensor 162 detects the current reversal and produces a voltage on line 40 which increases from the nominal level of 6VDC thereof by an amount proportional to the amount of regenerated current flow through motor 10. Thus, offset amplifier 161 produces a negative output voltage when motor 10 is regenerating in the forward direction. Since as discussed, the output of zero crossing detector 131 is a logic 0 during regeneration, and since the forward direction remains selected (i.e. a logic 1 remains on line 19), exclusive-OR gate 136 produces a logic 1 on line 134a. Inverter 137 responds by producing a logic 0 on line 134b. The complementary control signals on lines 134a, 134b deactivate and activate switches 166, 168, respectively, in motor scaler and absolute value generator section 160. Thus, the negative output of summing amplifier 161 is coupled through inverting path 165 and inverted to a positive signal by inverter 164. Here, inverter 164 is a conventional inverting op amp with unity gain. The now positive motor current signal is coupled on line 162 to comparator section 150.

Differential amplifier 154 in comparator section 150 produces an error signal on line 152, the level of which is proportional to the error between the speed difference and motor current signals on lines 142, 162, respectively. The error signal exceeds $V_{ref}$ when the motor current signal level is greater than the level of the speed error signal, and is less than $V_{ref}$ when the converse is true. Pulse width modulator 175 responds to the error signal by modulating the pulse width of the train of pulses produced thereby on line 176. During the transition of motor 10 from the motoring to the regenerating mode (or from the regenerating mode to the motoring mode), that is, upon the detection by zero cross detector 131 of a transition around zero volts by speed difference signal on line 122, a shutdown signal is generated on line 139 by motoring/regenerating sensor 130 to momentarily disable pulse width modulator 175. The shutdown signal on line 139 is normally a logic 0 in response to the output of inverter 133 (regardless of the logic state of the output of inverter 133). When the output of inverter 133 changes logic states, delay network 135 momentarily retains the previous logic state at one input of exclusive-OR gate 138 while the other input immediately changes logic states. For this time interval, the output of exclusive-OR gate 138 rises to a logic 1. This is coupled on line 139 to pulse width modulator 175 to briefly shut down the device. Pulse width modulator shuts down by producing a logic 0 output on line 176 in place of a pulse train. When delay network 135 allows both inputs to exclusive-OR gate 138 to become equal, the shutdown signal on line 139 returns to a logic 0, enabling pulse width modulator 175 to resume generating pulses on line 176. The momentary shutdown is necessary to prevent either switching transistor 182, 184 from conducting and to reset the intermediate ouptut 179 to zero during transition from the motoring to regenerating modes (and vice versa).

Break-before-make circuit 60 ensures that both switching transistors 182, 184 do not conduct at the same time in the time period immediately following transition from motoring to regeneration (or from regeneration to motoring). For example and as discussed, the complementary control signals on lines 134a, 134b are a logic 0 and a logic 1, respectively, when motor 10 is motoring in the forward direction. Lines 62a, 62b couple the logic 0 and logic 1 to AND gates 177a, 177b, respectively, enabling AND gate 177a and disabling AND gate 177b. As discussed, when motor 10 ceases motoring and begins regenerating, the complementary control signals on lines 134a, 134b switch logic states, the former becoming a logic 1 and the latter a logic 0. The transition on line 134b to a logic 0 couples directly through diode 68 and occurs on line 62b instantaneously, hence immediately disabling AND gate 177a. However, the transition on line 134a from logic 0 to logic 1 is delayed by the conventional delay network comprising resistor 63 and capacitor 64. Thus, the signal on line 62a does not switch to a logic 1 until a finite time after the signal on line 134a becomes a logic 1, delaying the enabling of AND gate 177b for such finite time. Thus it is seen that, since AND gates 177a, 177b are prevented from both being enabled by break-before-make circuit 60 during transition from motoring to regeneration, switching transistors 182, 184 cannot simultaneously conduct during such transition. A little thought reveals that break-before-make circuit 60 functions similarly during transition from regenerating to motoring.

After the transition period, the pulse-width modulated pulses on line 176 couple through AND gate 177b and driver 178b to switching transistor 184 via line 174 and driver 185. Since AND gate 178a is disabled when motor 10 is regenerating in the forward direction, a logic 0 is coupled to the base of transistor 182 via line 172. Thus, switching transistor 182 becomes nonconducting during the entire regenerating mode. Switching transistor 184 responds to the pulse-width-modulated pulses applied to the base thereof by conducting for the duration of each pulse and being nonconducting between pulses. When transistor 184 conducts, terminal 11a is coupled to −Bus 14 and a short circuit is applied across motor 10 via transistor 184 and relay 18. While transistor 184 is non-conducting, inductance in the motor armature will cause a high positive voltage to appear on line 11a. As the generated voltage exceeds the positive DC voltage on +Bus 12 (here +160 VDC, nominally), diode 186 conducts to protect transistor 182 and the regenerated current from motor 10 flows into power supply 16 via +Bus 12. This maintains the regenerative current from motor 10 but decreases according to inductance formulas and back EMF of motor 10 which is proportional to motor speed. The conductance of switching transistor 184 in response to a pulse applied to its base shorts out motor 10 via −Bus 12 and relay 18 and increases the current through motor 10 according to factors described heretofore. Thus, the current regenerated by motor 10 is fed back through motor 10 via transistor 184, −Bus 14, relay 18 and current sensor 162. The current increases in the armature windings of motor 10, imposing a large electrical load on the regenerating motor. Since the mechanical power applied to motor 10 (i.e. due to the inertia of the object to be slowed) does not correspondingly increase, motor 10 slows down, thus applying braking to the object.

Motor controller 9 ensures that motor 10 slows down smoothly by modulating the width of the pulses applied to transistor 184 and controlling the rate at which regenerated power is dissipated into the power supply. As stated, regenerated current flows through current sensor 162 increasing for the duration of each pulse from pulse width modulator 175 and decreasing between each pulse. The motor current signal on line 162 assumes a level representative of the magnitude of the regenerated current. When the level of the motor current signal is less than the level of the speed difference signal on line 142, the error signal output of differential amplifier 154 decreases below $V_{ref}$. Pulse width modulator 175 responds by increasing the width of the pulses produced on line 176. Thus, transistor 184 conducts for a larger time during each cycle of the pulse train on line 176, allowing more regenerated current to flow through and be dissipated by the power supply through diode 186 when transistor 184 is turned off. The speed of motor 10 thus decreases, and the actual and selected motor speeds become closer. The level of the speed difference signal on line 142 thus decreases. At the same time the level of the motor current signal on line 162 increases due to the increased current flow through motor 10. Differential amplifier 154 responds by increasing the level of the error signal on line 152 above $V_{ref}$. Pulse width modulator 175 in turn decreases the width of the output pulses thereof. Transistor 184 thus conducts for less time, decreasing the regenerated current permitted to flow through motor 10. The speed of motor 10 thus decreases.

Thus, it is seen that motor controller 9 controls the rate at which motor 10 slows during regeneration by modulating at a frequency of 3 KHz the amount of regenerated current while attempting to make equal the levels of the speed difference and motor current signals on lines 142, 162, respectively. When motor 10 rotates too rapidly, the speed difference signal level exceeds that of the motor current signal and pulse width modulator 175 increases the width of the pulses applied to transistor 184. More regenerated current flows through motor 10, slowing the motor. If motor 10 slows excessively, the motor current signal level exceeds the speed difference signal level and pulse width modulator 175 decreases the width of the pulses applied to transistor 184. Less regenerated current thus flows through motor 10, allowing motor speed to increase.

Motoring; Reverse Direction

When the reverse direction of motor 10 is selected, the direction control signal on line 19 becomes a logic 0, activating relay 18. Return line 11b of motor 10 is coupled to terminal 18b and to +Bus 12. As will be discussed, motoring/regenerating sensor section 130 responds to the logic 0 direction control signal to enable AND gate 177b and disable AND gate 177a during reverse direction motoring by placing a logic 1 on line 134a and a logic 0 on line 134b. Current thus flows from +Bus 12, through relay 18, current sensor 162, motor 10 and switching transistor 184 to −Bus 14 in the direction of arrow 165. Since actual motor speed is less than selected speed during motoring the speed difference signal on line 122 is positive. Thus, such signal couples through noninverting path 141 of absolute value generator section 140, current limiter 147 and buffer 148 and appears on line 142.

Since current is flowing through current sensor 162 in the direction of arrow 165, the output of summing amplifier 161 is a negative voltage. Thus, inverting path 165 of current scaler and absolute value generator section 160 is activated. Exclusive-OR gate 136 in motoring/regenerating sensor section 130 responds to the logic 0 direction control signal and logic 1 output of zero crossing detector 131 to generate a logic 1 on line 134a. Inverter 137 thus produces a logic 0 on line 134b to activate inverting path 165. Therefore, a positive motor current signal is coupled onto line 162 via inverter 164. Comparator section 150 produces an error signal on line 152 corresponding to the difference between the speed difference and motor current signals. Pulse width modulator 175 responds to the error signal by modulating the width of the output pulses thereof. Such pulses are coupled through AND gate 177b (due to the logic 1 coupled thereto from line 134a ) to transistor 184. A logic 0 is applied to transistor 182 from AND gate 177a, disabled by the logic 0 control signal on line 134b.

During motoring in the reverse direction, transistor 184 responds to the pulse width modulated pulses applied thereto to couple and decouple voltage to and from motor 10 in the same manner as transistor 182 operates during motoring in the forward direction. Motor current is adjusted at a 3 KHz rate to maintain equal the speed difference and motor current signal levels on lines 142, 162, respectively. That is, the duration of conduction of transistor 184 is modulated at a 3 KHz rate to maintain actual motor speed equal to the selected speed and to do so despite substantial amounts of voltage ripple between +Bus 12 and −Bus 14.

Regenerating; Reverse Direction

When motor 10 is used to apply braking in the reverse direction, actual motor speed exceeds selected speed, due to the mechanical force applied to motor 10 by the high inertia object to be slowed. Thus, the speed difference signal on line 122 goes negative, causing zero crossing detector to produce a logic 0 on line 132b. The inverting path 143 of absolute value generator section is activated, and the negative speed difference signal is inverted to a positive signal by inverter 146. Such signal, limited by current limiter 147, is coupled through buffer 148 onto line 142.

During regeneration in the reverse direction the direction of current flow through motor 10 switches to the direction of arrow 163. The output of summing amplifier 161 is thus a positive signal. Noninverting path 163 is activated by the control signal on line 134a which is switched to a logic 0 by exclusive-OR gate 136 in response to the logic 0 direction control signal and logic 0 output of zero crossing detector 131. The positive output of summing amplifier 161 is coupled directly to line 162. Differential amplifier 154 responds to the speed difference and motor current signals on lines 142, 162 by producing an error signal on line 152 in response to the level difference therebetween. Pulse width modulator 175 responds to the error signal by modulating the width of the output pulses thereof. The pulses are coupled through AND gate 177a, which is enabled in response to the logic 1 control signal on line 134b, to transistor 182. Transistor 184 is fed by a logic 0 from AND gate 177b, which is disabled in response to the logic 0 control signal on line 134a.

During reverse direction regeneration, switching transistor 182 responds to the pulse width modulated pulses applied thereto to couple and decouple a short circuit across motor 10 in the same way as does transistor 184 during forward direction regenerating. Thus, the regenerated current in the armature windings of motor 10 is adjusted at a 3 KHz rate to maintain the signal levels on lines 142, 162 equal. In other words, the duration of conductance of transistor 182 is modulated to slow motor 10 smoothly and hence permit motor 10 to apply constant braking to the load mechanically coupled thereto.

Having described a preferred embodiment of the present invention, modifications and alterations thereof may become apparent to those skilled in the art. Therefore, the scope of the present invention is understood to be limited only by the scope of the appended claims.

What is claimed is:

1. In combination:
    a motor having a pair of input terminals adapted for serially coupling the motor to a power supply, said motor having a speed and direction of rotation related to a current passing therethrough and driving a load having a predetermined mechanical resonant frequency;
    means for producing an error signal representative of the difference between the speed of the motor and a selected motor speed;
    a first switch disposed in series between the power supply and one of the pair of input terminals of the motor, the first switch being responsive to a first control signal;
    a second switch connected in parallel across the pair of input terminals of the motor, the second switch being responsive to a second control signal;

means, responsive to the speed error signal and a signal representative of the motor current, for producing a pulse train having a nominal frequency and duty cycle, such nominal frequency being substantially higher than the mechanical resonant frequency, and for modulating said duty cycle in accordance with the difference between the speed error signal and the signal representative of the motor current; and means for controlling the speed fo the motor at a frequency substantially higher than the mechanical resonant frequency of the load, said speed controlling means comprising means for coupling said modulated pulse train to the first switch as the first control signal when the rotational speed of the motor is less than the selected speed to increase the motor speed, and for alternately coupling said modulated pulse train to the second switch as the second control signal when the rotational speed of the motor exceeds the selected speed to decrease the speed of the motor.

2. The combination of claim 1 further comprising:

power supply means, fed by an Ac power signal, for rectifying said AC power signal and producing a DC output voltage having an amplitude ripple thereon, said DC output voltage being coupled across the motor and the first switch; and wherein the frequency of the pulse train is substatially greater than the frequency of said amplitude ripple.

3. The combination of claim 1 wherein the coupling means comprises means for delaying the coupling of the modulated pulse train to the second swtich for a predetermined time after the motor exceeds the selected speed.

4. The combination of claim 1 further comprising means for reversing the direction of rotation of the motor.

5. Apparatus for controlling the rate of rotation of a motor driving a load, the load having a predetermined mechanical resonant frequency, such apparatus comprising:

means for generating a first signal having a magnitude corresponding to the rate of rotation of the motor;

means for comparing said first signal with a reference signal, the reference signal having a predetermined magnitude corresponding to the selected speed of rotation of the motor, said comparing means generating a speed difference signal having a level representative of the difference between the magnitudes of the first signal and the reference signal;

means, responsive to the electrical current flowing in said motor, for generating a second signal having a level corresponding to the magnitude of said current;

means, responsive to the speed difference signal and the second signal, for producing an error signal having a level corresponding to the difference between the speed difference signal and the second signal; and means, responsive to the error signal, for switchably coupling current to and decoupling current from the motor in accordance with the error signal level at a frequency substantially higher than the mechanical resonant frequency of the load, said power coupling and decoupling means comprising:

(a) means for generating a pulse train having a nominal frequency and duty cycle, such nominal frequency being selected to be substantially higher than the mechanical resonant frequency of the load;

(b) means, responsive to said pulse train, for coupling current to the motor during each pulse of the pulse train and decoupling current from the motor between pulses; and (c) wherein the pulse train generating means modulates the duty cycle of the pulses in accordance with the level of the error signal.

6. Apparatus for controlling the rotational speed of motor, the motor driving a load having a predetermined mechanical resonant frequency, such apparatus comprising:

means for generating a first signal having a level representative of the actual speed of rotation of the motor;

means for generating a reference signal having a level corresponding to a selected speed of rotation of the motor;

means for subtracting the first signal from the reference signal producing a speed difference signal and for integrating said speed difference signal;

means, responsive to electrical current flowing through the motor, for producing a second signal having a level representative of the level of said current flow;

means for comparing the levels of the speed difference signal and the second signal and for generating an error signal having a level corresponding to the difference between the second signal and the speed difference signal;

means, responsive to the error signal, for generating a train of pulses of nominal frequency and pulse width and modulating said pulse width in accordance with the level of the error signal;

wherein such nominal frequency is selected to be substantially higher than the mechanical resonant frequency of the load; and means, solely responsive to the train of pulses, for coupling voltage to the motor for the duration of each pulse and for decoupling voltage from the motor during the interval between each pulse of the pulse train.

* * * * *